US008376667B2

(12) United States Patent
Wilbert et al.

(10) Patent No.: US 8,376,667 B2
(45) Date of Patent: Feb. 19, 2013

(54) AC/DC MAGNETIC DRILL PRESS

(75) Inventors: Edward D. Wilbert, Hubertus, WI (US); John S. Scott, Brookfield, WI (US); Jonathan A. Zick, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1053 days.

(21) Appl. No.: 12/178,998

(22) Filed: Jul. 24, 2008

(65) Prior Publication Data

US 2009/0028653 A1 Jan. 29, 2009

Related U.S. Application Data

(60) Provisional application No. 60/952,367, filed on Jul. 27, 2007.

(51) Int. Cl.
*B23B 45/14* (2006.01)

(52) U.S. Cl. .......................................... 408/76; 408/124

(58) Field of Classification Search .................... 408/76, 408/124; 318/139, 400.3, 400.38; 388/937; 200/522, 43.17; 173/217
See application file for complete search history.

(56) References Cited

U.S. PATENT DOCUMENTS

| | | | | |
|---|---|---|---|---|
| 2,622,457 A | | 12/1952 | Buck | |
| 2,820,377 A | | 2/1958 | Buck | |
| 2,879,678 A | | 3/1959 | Kaiser, Jr. | |
| 3,321,688 A | * | 5/1967 | Von Delden | 318/781 |
| 3,342,089 A | | 9/1967 | Palm | |
| 3,596,558 A | | 8/1971 | Rydell | |
| 3,623,823 A | | 11/1971 | Val | |
| 3,677,656 A | | 7/1972 | Buck | |
| 3,728,027 A | | 4/1973 | Watanabe | |
| 3,791,755 A | | 2/1974 | Warren | |
| 3,796,506 A | | 3/1974 | Buck | |
| 3,969,036 A | | 7/1976 | Hougen | |
| 4,012,162 A | | 3/1977 | Warren | |
| RE30,519 E | | 2/1981 | Hougen | |
| 4,261,673 A | | 4/1981 | Hougen | |
| 4,278,371 A | | 7/1981 | Meyer | |
| 4,390,309 A | | 6/1983 | Fangmann | |
| 4,456,410 A | | 6/1984 | Mikiya et al. | |
| 4,541,759 A | | 9/1985 | Miyoshi | |
| 4,559,577 A | | 12/1985 | Shoji et al. | |
| 4,591,301 A | * | 5/1986 | Pelfrey | 408/76 |
| 4,604,006 A | * | 8/1986 | Shoji et al. | 408/76 |
| 4,639,170 A | | 1/1987 | Palm | |
| 4,687,385 A | * | 8/1987 | Palm | 408/76 |
| 4,780,654 A | | 10/1988 | Shoji et al. | |
| 4,820,088 A | | 4/1989 | Ooki et al. | |
| 4,831,364 A | | 5/1989 | Shinohara et al. | |
| RE33,145 E | | 1/1990 | Palm | |

(Continued)

OTHER PUBLICATIONS

Unitec Catalog, CS Unitec, Inc., 2010, 64 pages.

*Primary Examiner* — Daniel Howell
*Assistant Examiner* — Paul M Janeski
(74) *Attorney, Agent, or Firm* — Michael Best & Friedrich LLP

(57) ABSTRACT

A drill press includes a housing and a motor assembly, with a motor carriage attached to the housing. The motor assembly includes an electric motor and drill bit, and the motor carriage is operable for moving the motor assembly relative to the housing. A base, coupled to a portion of the housing, is operable for magnetically coupling the tool to a workpiece. The drill press also includes a DC power source and an AC power input for providing power to the motor. A power supply switching unit, electrically coupled to DC power source and the AC power input, selectively electrically couples the motor with one of the DC power source and the AC power input for providing power to the motor.

20 Claims, 12 Drawing Sheets

U.S. PATENT DOCUMENTS

| | | | | |
|---|---|---|---|---|
| 5,007,776 | A | 4/1991 | Shoji | |
| 5,035,547 | A | 7/1991 | Shoji | |
| 5,035,549 | A | 7/1991 | Asano et al. | |
| 5,087,157 | A | 2/1992 | Shoji et al. | |
| 5,096,339 | A | 3/1992 | Shoji | |
| 5,165,827 | A | 11/1992 | Miller | |
| 5,174,690 | A | 12/1992 | Targett et al. | |
| 5,207,539 | A | 5/1993 | Mueller | |
| 5,275,514 | A * | 1/1994 | Johnson | 408/76 |
| 5,328,303 | A | 7/1994 | Jang | |
| 5,342,153 | A * | 8/1994 | Dobkins | 408/1 R |
| 5,415,503 | A * | 5/1995 | Strange et al. | 408/76 |
| 5,902,076 | A | 5/1999 | Miller et al. | |
| 6,102,633 | A * | 8/2000 | Uehlein-Proctor | 408/129 |
| 6,280,123 | B1 * | 8/2001 | Gill | 408/76 |
| 6,368,133 | B1 | 4/2002 | Zeiler et al. | |
| 7,058,291 | B2 * | 6/2006 | Weaver et al. | 318/720 |
| 7,121,773 | B2 | 10/2006 | Mikiya et al. | |
| 7,267,512 | B1 | 9/2007 | Mueller | |
| 7,520,702 | B2 | 4/2009 | Wiehler et al. | |
| 7,862,267 | B2 | 1/2011 | Shimada | |
| 7,936,142 | B2 | 5/2011 | Otsuka et al. | |
| 2006/0072306 | A1 * | 4/2006 | Woodyard | 362/157 |
| 2007/0059186 | A1 * | 3/2007 | Weaver et al. | 417/234 |
| 2007/0103119 | A1 * | 5/2007 | Young | 320/130 |
| 2007/0132428 | A1 * | 6/2007 | Wise | 320/114 |
| 2009/0028653 | A1 | 1/2009 | Wilbert et al. | |
| 2010/0021249 | A1 | 1/2010 | Beichter | |
| 2010/0028093 | A1 | 2/2010 | Otsuka | |
| 2010/0290847 | A1 | 11/2010 | Beichter et al. | |
| 2011/0027026 | A1 | 2/2011 | Omi et al. | |

* cited by examiner

AC/DC MAGNETIC DRILL PRESS

CROSS-REFERENCE TO RELATED APPLICATION

This application claims priority to U.S. Provisional Application No. 60/952,367, entitled "AC/DC Magnetic Drill Press", filed Jul. 27, 2007 by Edward D. Wilbert, John S. Scott, and Jonathon A. Zick, the entire contents of which is hereby incorporated by reference.

BACKGROUND

The present invention generally relates to power tools and, more specifically, to magnetic-base drill presses.

Magnetic-base drill presses perform drilling operations by attaching a base portion of the drill press magnetically to a ferromagnetic workpiece. The magnetic base of a magnetic drill press is switchably operable between magnetized and demagnetized positions using electromagnets or permanent magnets. AC powered magnetic drill presses may be run non-stop, so long as they receive a constant source of AC electric power. However, AC powered magnetic drill presses lack utility under circumstances where AC power is unavailable.

SUMMARY

In one embodiment, the invention provides a power tool comprising a housing and a base coupled to a portion of the housing. The base is operable for magnetically coupling the tool to a workpiece. The power tool includes an electric motor supported by the housing, and a DC power source and an AC power input for providing power to the motor. A power supply switching unit, electrically coupled to the DC power source and the AC power input, selectively electrically couples the motor with one of the DC power source and the AC power input.

In another embodiment, the invention provides a drill press comprising a housing, and a motor assembly. The motor assembly includes an electric motor and drill bit. A motor carriage is attached to the housing, and the motor carriage is operable for moving the motor assembly relative to the housing. A base, coupled to a portion of the housing, is operable for magnetically coupling the tool to a workpiece. The drill press also includes a DC power source and an AC power input for providing power to the motor. A power supply switching unit, electrically coupled to the DC power source and the AC power input, selectively electrically couples the motor with one of the DC power source and the AC power input for providing power to the motor.

Other aspects of the invention will become apparent by consideration of the detailed description and accompanying drawings.

Figure 1A:
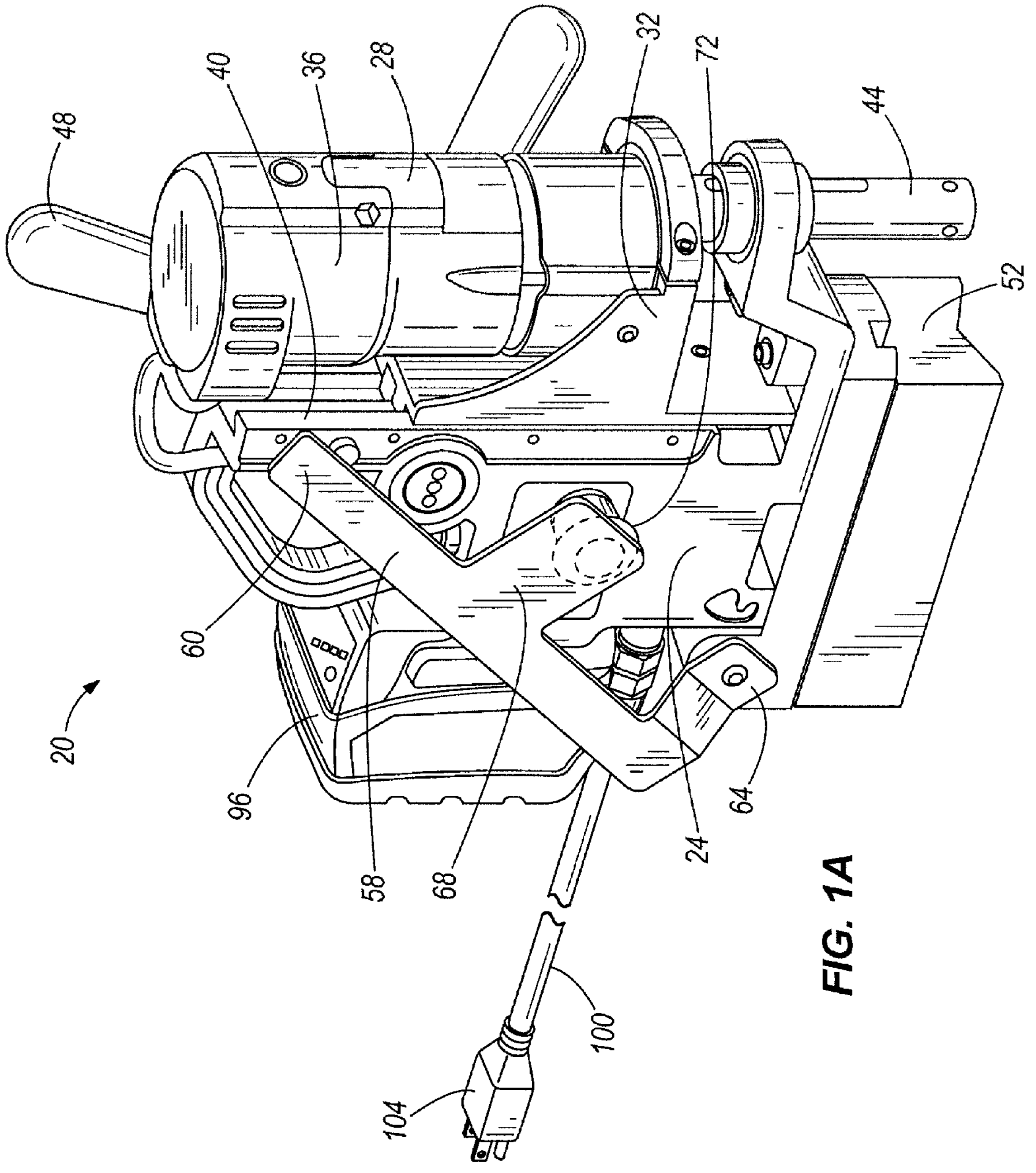
FIG. 1A is a perspective view of a magnetic drill press according to one embodiment of the invention, with the drill press shown in a demagnetized position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1A-1C and 2-3 illustrate a drill press 20 according to one embodiment of the invention. The drill press 20 includes a housing 24, a motor housing 28 and a motor carriage 32. An AC electric motor 36 is housed within the motor housing 28. The motor housing 28 and the motor 36 are coupled to the motor carriage 32, which moves vertically along a rack 40 that is in turn coupled to the housing 24. The motor 36 is coupled to a bit 44 used to drill into a workpiece (not shown). A user works the bit 44 into the workpiece by moving the motor carriage 32 along the rack 40. The user actuates a handle 48, which engages with the rack 40 and then moves the motor carriage 32 in the desired direction (e.g., up or down along the rack 40).

Figure 3:
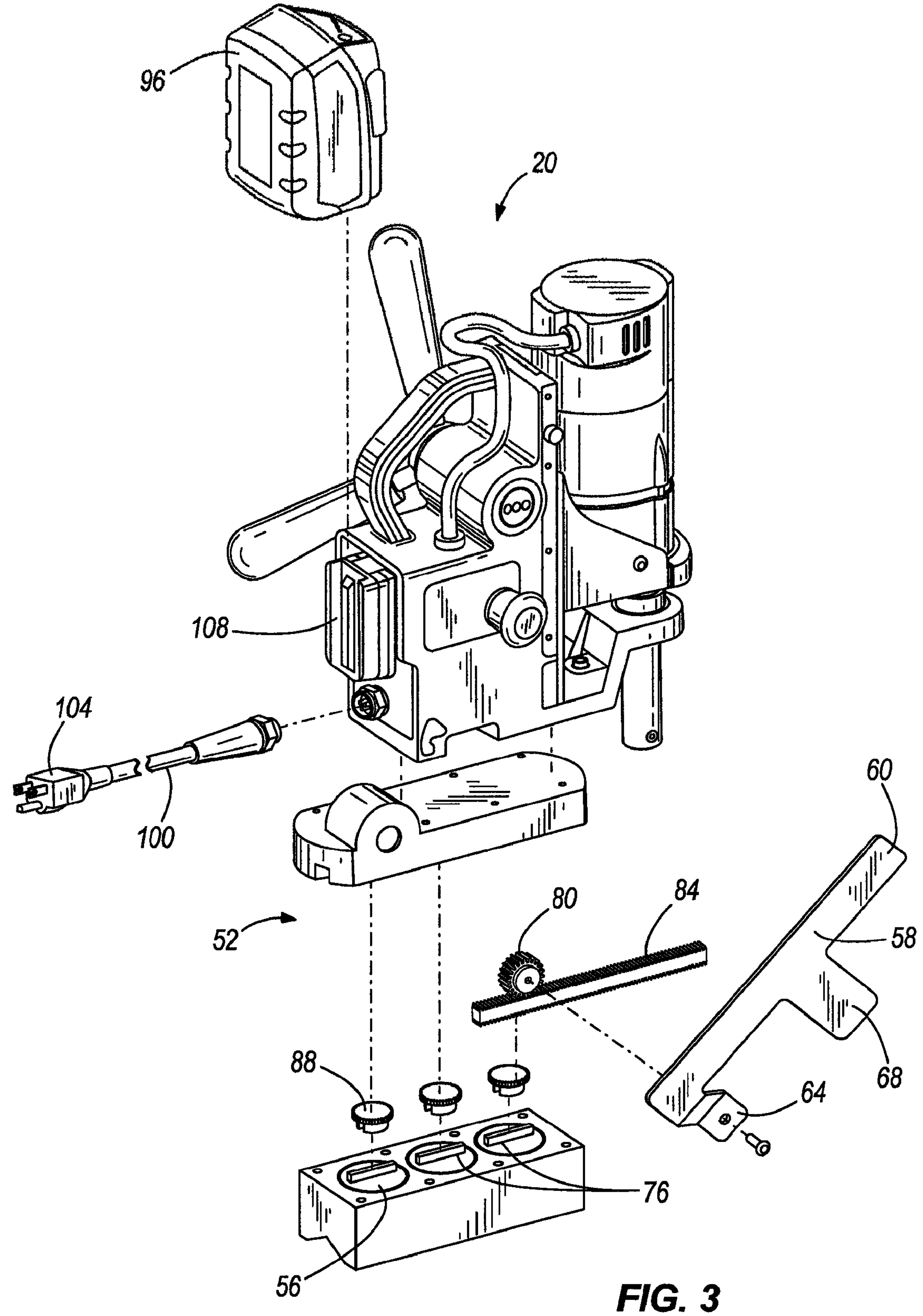
FIG. 3 is an exploded view of the drill press shown in FIG. 1A.

The drill press 20 further includes a magnetic base or stand 52 for magnetically detachably coupling the drill press 20 and a ferromagnetic workpiece. Once magnetized, the magnetic base 52 secures the press 20 to the workpiece via a magnetic field generated by magnets 56 (FIG. 3). In the illustrated embodiment, the base 52 is actuated between a magnetized position (FIGS. 1B-1C) and a demagnetized position (FIG. 1A) by a lever 58. The lever 58 includes a first end 60 defining a handle and a second end 64 pivotally coupled to the base 52. The lever 58 further includes an interlock tab 68 positioned between the first and second ends 60, 64. The interlock tab 68 prevents use of the drill press 20 when the press 20 is decoupled from the workpiece. FIG. 1A illustrates the lever 58 in the demagnetized position, and FIGS. 1B and 1C illustrate the lever 58 in the horizontal, magnetized position.

Figure 1B:
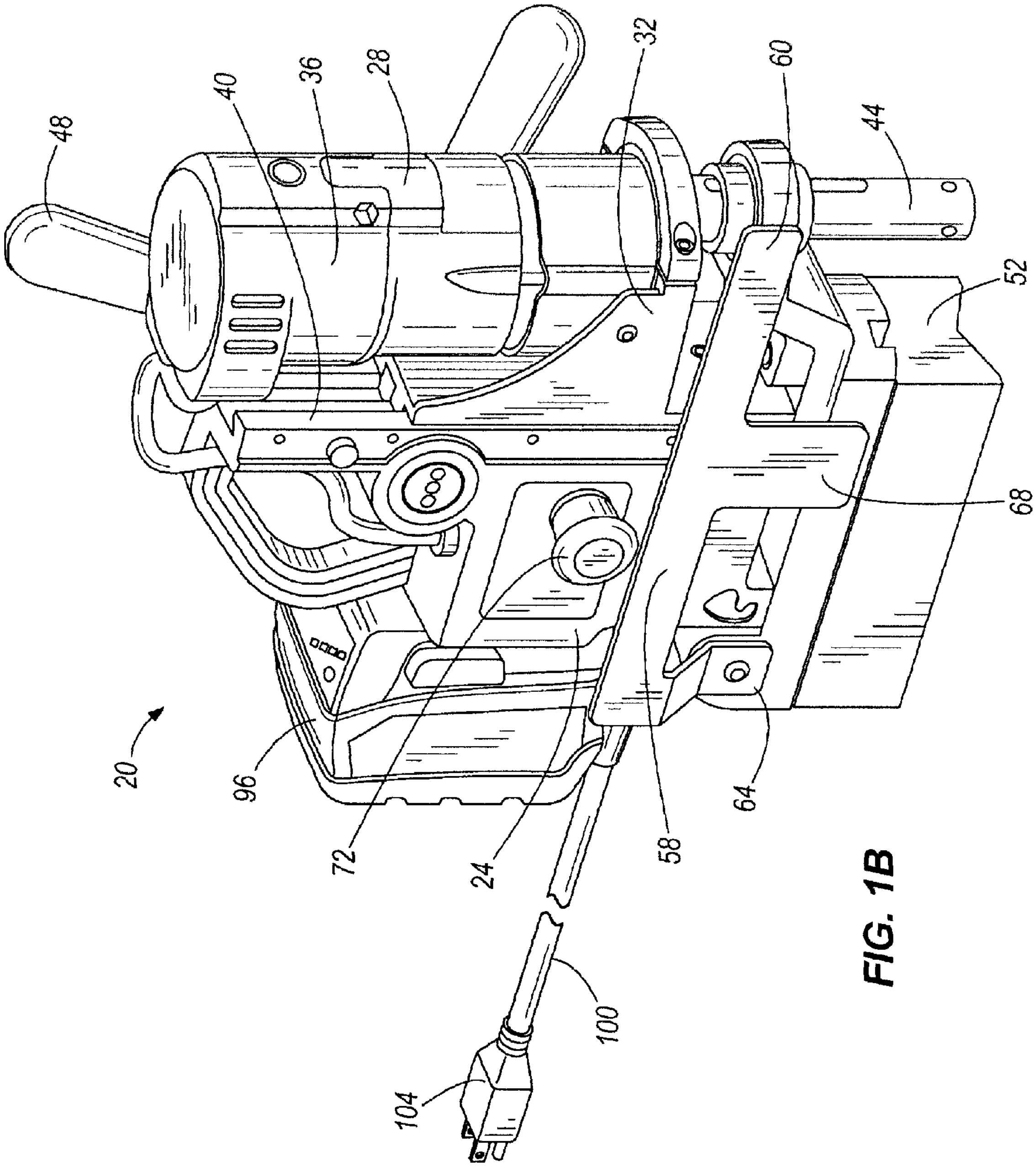
FIG. 1B is a detail view of the drill press shown in FIG. 1A, and shown in a magnetized position.
Figure 1C:
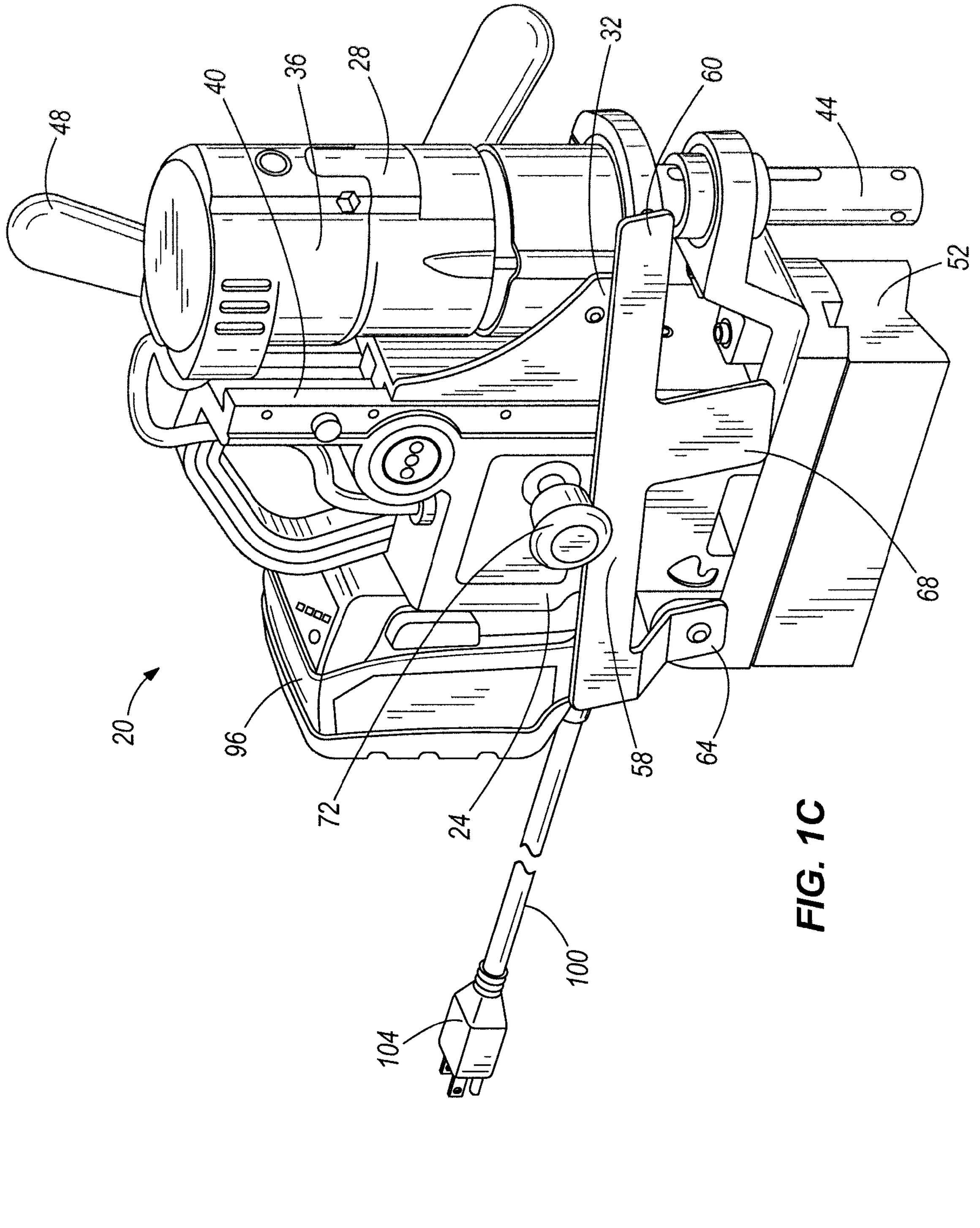
FIG. 1C is a detail view of the drill press shown in FIG. 1A, and showing operation of a mechanical interlock between a magnetic base actuating lever and a power switch.

FIGS. 1A-1C illustrate a mechanical interlock between a power (on/off) switch 72 of the drill press 20 and the magnetic base actuating lever 58. The power switch 72 operates as a push/pull knob or button. With the power switch 72 in a fully in position (FIGS. 1A and 1B), the drill press 20 is "off" and the motor 36 is not powered. Likewise, with the switch 72 in a fully out position (FIG. 1C), the drill press 20 is "on" and power is provided to the motor. Referring to FIG. 1A, when the lever 58 is in a demagnetized position, whereby base 52 is substantially demagnetized and decoupled from a workpiece, the interlock tab 68 of lever 58 prevents outward movement of the switch 72 (i.e., movement of the switch 72 to the on position). Thus, the interlock tab 68 prevents the user from operating the drill press 20 when the base 52 is demagnetized and not coupled to a workpiece.

In order to move the lever 58 to the magnetized position, thereby generating the magnetic field whereby the base 52 is secured to a workpiece, the switch 72 is in the off position. When the lever 58 is moved to the magnetized position, withdrawal of the power switch 72 to the on position is allowed. Referring to FIG. 1C, the power switch 72 is dimensioned such that in the outward, on position, the switch 72 extends into a travel path of the lever 58, thereby creating an interference between the power switch 72 and the lever 58. The extended power switch 72 interferes with rotational travel of the lever 58 to prevent the user from demagnetizing the base 52, and thereby decoupling the base from the workpiece, when the drill press 20 is on. In order to demagnetize the base 52, the user must move the power switch to the off position before moving the lever 58 to the demagnetized position.

Figure 4:
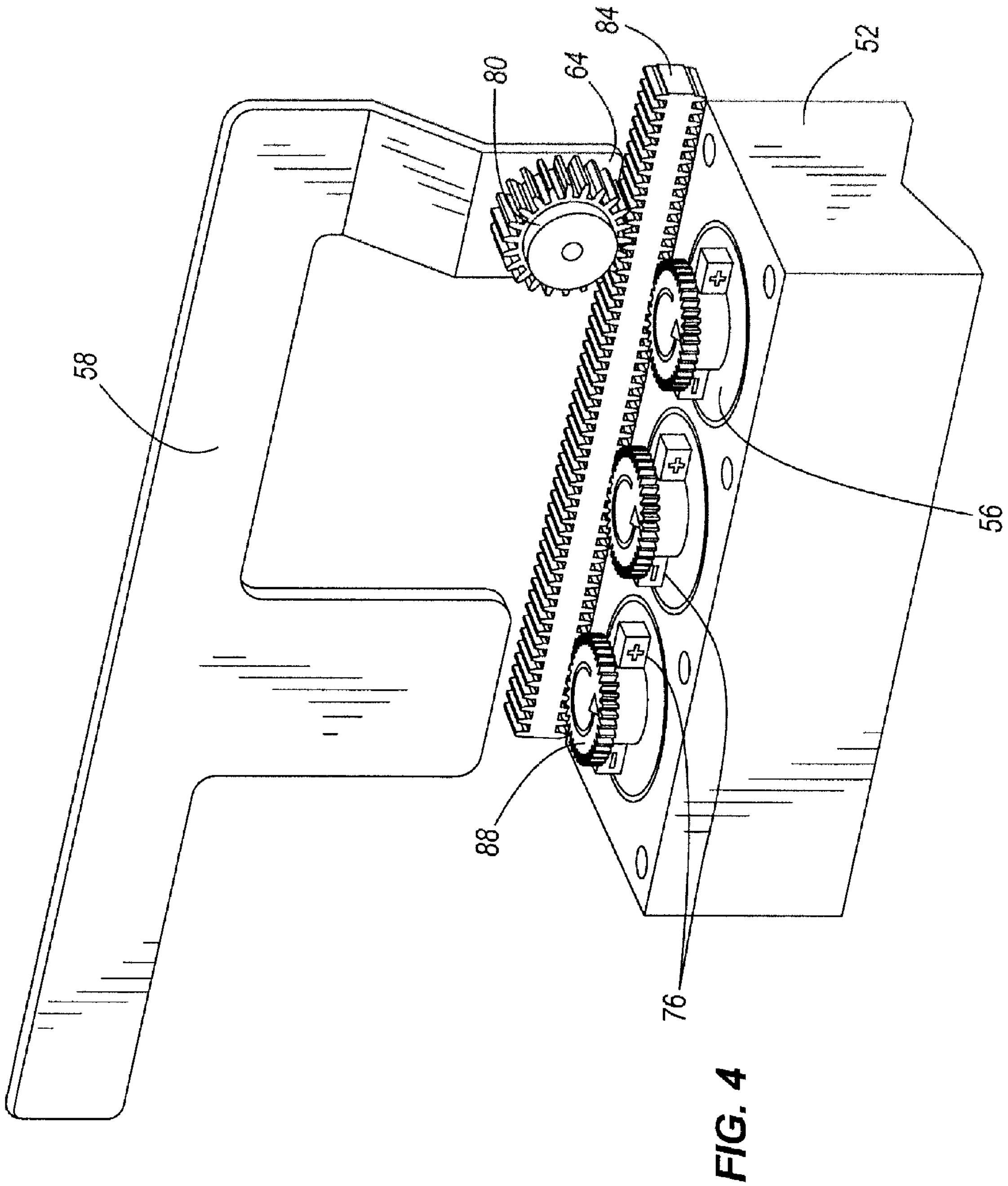
FIG. 4 is an internal perspective view of a magnetic base of the drill press shown in FIG. 1A, with the base shown in the magnetized position.
Figure 5:
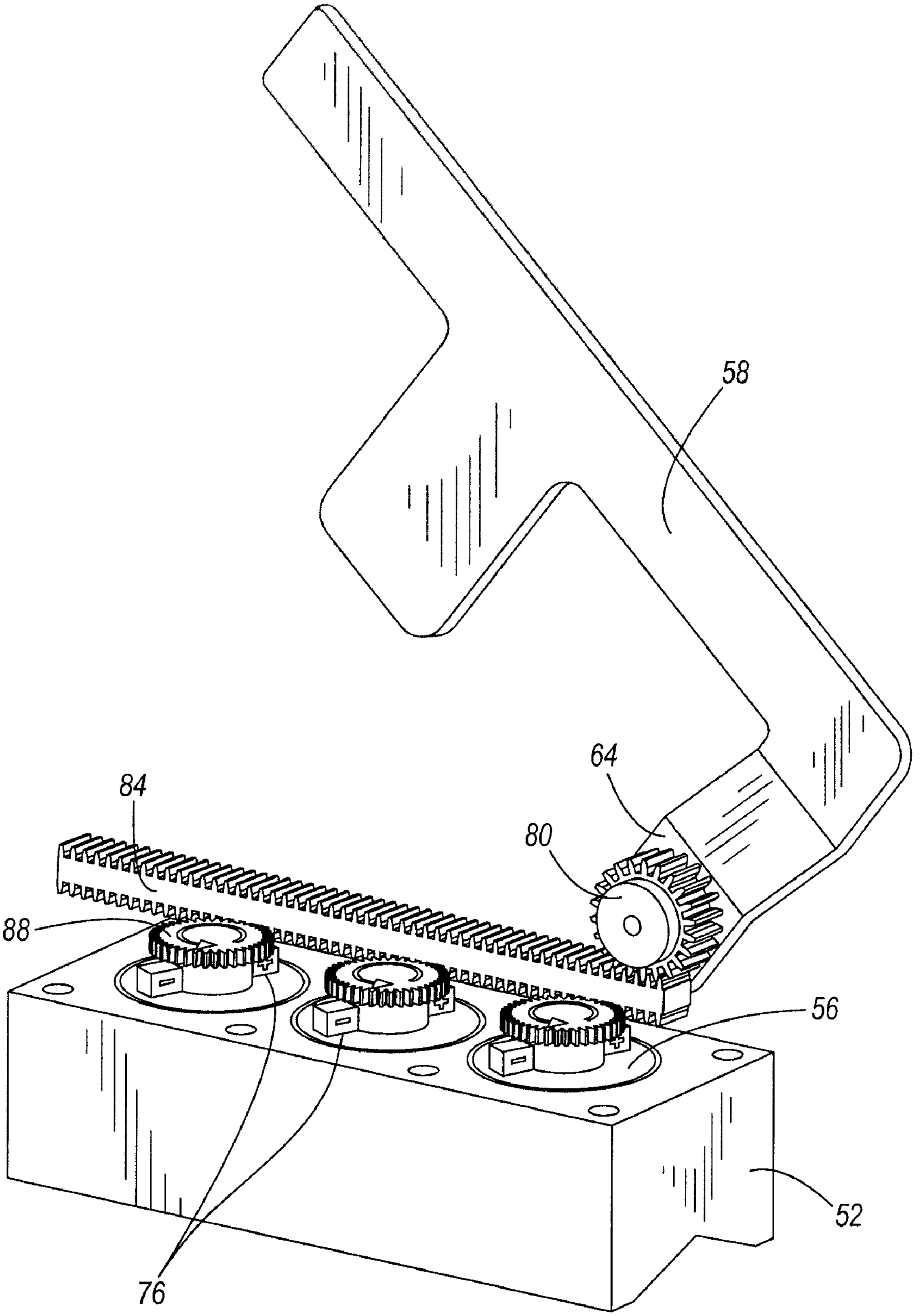
FIG. 5 is an internal perspective view of the magnetic base of the drill press shown in FIG. 1A, with the base shown in the demagnetized position.

FIGS. 3-5 illustrates internal components of the magnetic base 52, including permanent magnets 56 that create a strong magnetic field when opposite poles 76 of the magnets 56 are aligned. The base 52 secures the press 20 to the ferromagnetic workpiece (not shown) via the magnetic field generated by the aligned magnets 56. The magnets 56 are movable between an aligned position (FIG. 4), whereby opposite poles 76 of the magnets 56 are aligned to magnetize the base 52, and an un-aligned position (FIG. 5), whereby opposite poles 76 of the magnets 56 are not aligned and the base 52 is substantially demagnetized. In the illustrated embodiment, three magnets are used, but in further embodiments fewer or more magnets may be used.

The base 52 also includes a pinion gear 80 coupled to the second end 64 of the lever 58, a gear-toothed rack 84, and geared head portions 88, each of the head portions 88 coupled to one of the magnets 56 such that each magnet 56 rotates with the respective head portion 88. The pinion gear 80 intermeshes with one side of the rack 84, and an opposite side of the rack 84 intermeshes with the head portions 88.

With the lever 58 in the magnetized position (FIGS. 1B and 4), opposite (i.e., positive and negative) poles 76 of adjacent magnets 56 are aligned, thereby creating a magnetic field to secure the base 52 to the workpiece (not shown). Once drilling operations are complete and the power switch 72 has been placed in the off position, the user rotates the lever 58 to the demagnetized position. Rotating the lever 58 to the demagnetized position causes the pinion gear 80 to act upon the rack 84 and thereby rotate the head portions 88 of the magnets 56 approximately 90 degrees (FIGS. 1A and 5). In a further embodiment, the head portions 88 may rotate more or less than 90 degrees. The magnetic poles 76 of adjacent magnets 56 are rotated out of alignment, and the magnetic field created by base 52 is weakened to decouple the base 52 from the workpiece and allow repositioning of the drill press 20.

Figure 2:
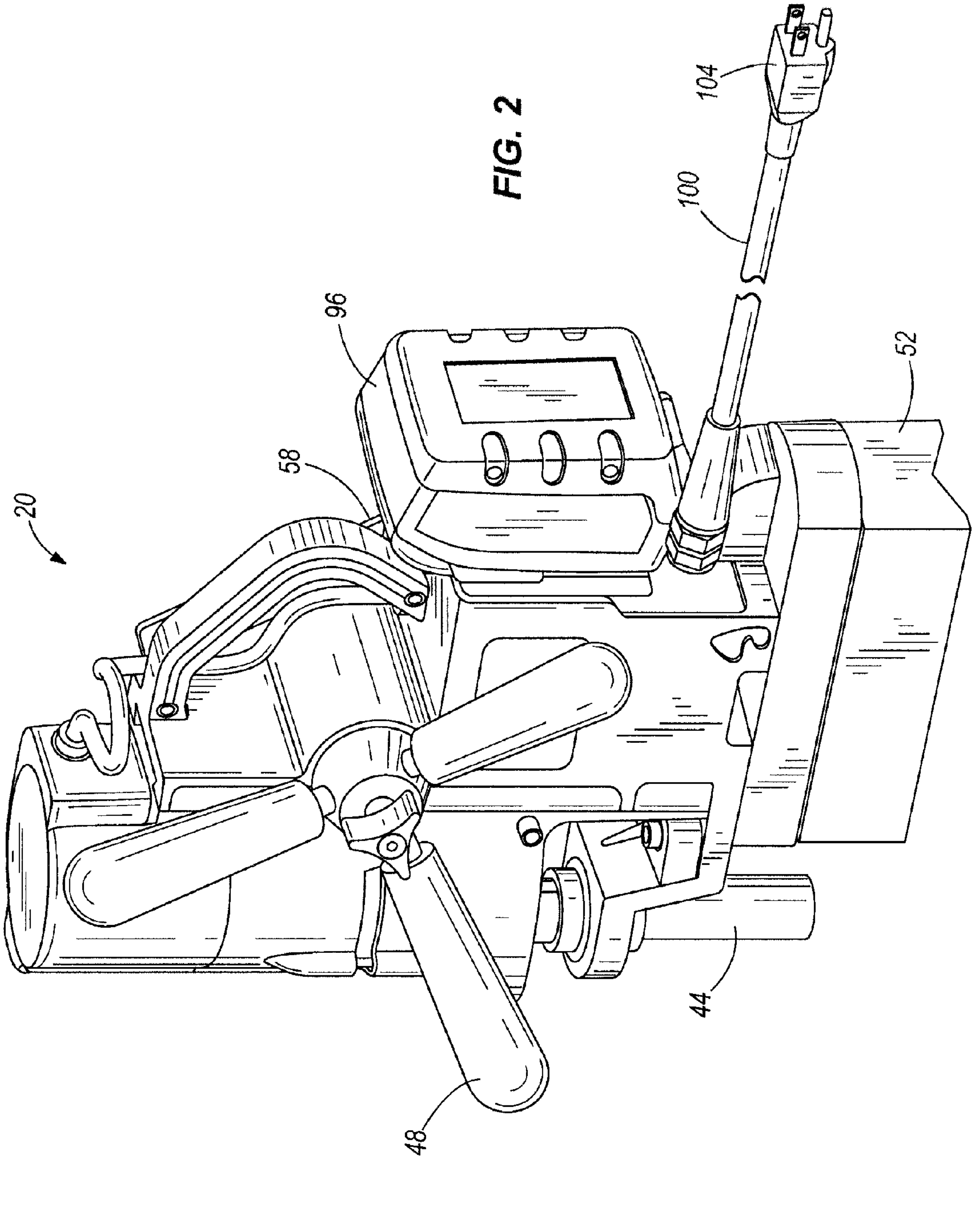
FIG. 2 is a rear perspective of the drill press shown in FIG. 1A.

As shown in FIGS. 1-3, the drill press 20 may be powered by either an AC power source 92 (FIG. 6) or a DC power source 96. The press 20 includes an electrical cord 100 and plug 104 to connect to the AC power source 92. The AC power source 92 may be a conventional 120V or 240V power source. In the illustrated embodiments, the electrical cord 100 and plug 104 may be of a quick detachable type, such as the QUIK-LOK® cord of Milwaukee Electric Tool Corporation (Brookfield, Wis.) or the detachable power cord disclosed by U.S. Pat. No. 6,609,924, entitled "Quick Lock Power Cord", the entire contents of which is hereby incorporated by reference. A detachable power cord allows for cords of various lengths to be used, and easy and quick replacement of cords that are cut, frayed, or otherwise damaged.

Referring to FIG. 3, the drill press 20 also includes a battery pack connector block 108 to connect the DC power source 96. In the illustrated embodiment, the DC power source 96 is a removeable, rechargeable battery pack that electrically couples to the motor 36 such that the drill press 20 can operate as a portable, battery-operated power tool. The illustrated battery pack 96 is a 28-volt power tool battery pack including seven (7) Lithium-ion battery cells and slidingly coupled to the drill press 20 via the connector block 108. In other embodiments, the battery pack 96 may include fewer or more battery cells such that the battery pack is a 14.4-volt power tool battery pack, a 32-volt power tool battery pack, or the like. Additionally or alternatively, the battery cells may have chemistries other than Lithium-ion such as, for example, Nickel Cadmium, Nickel Metal-Hydride, or the like.

Figure 6:
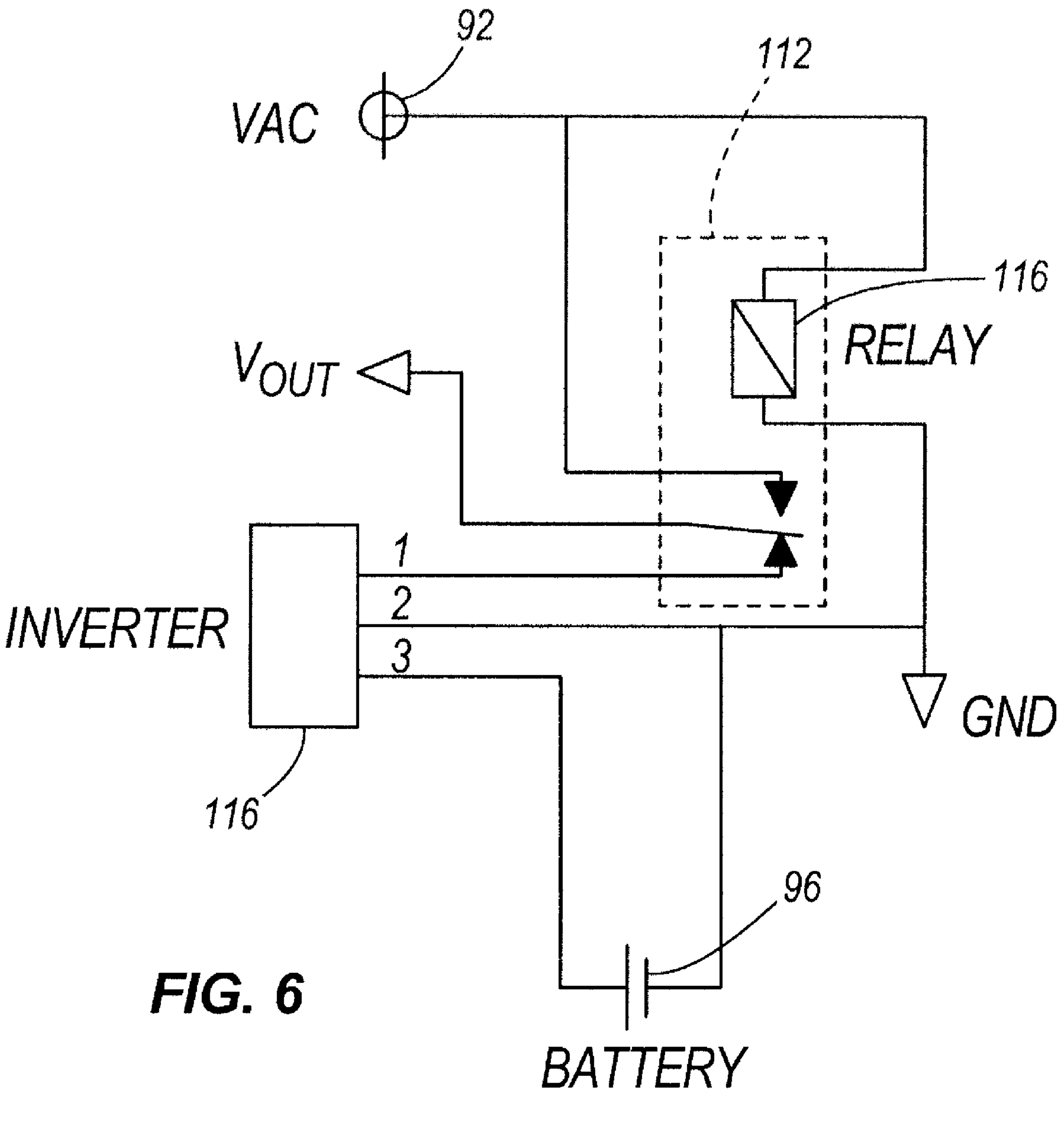
FIG. 6 is a circuit diagram illustrating a power switching module of the drill press shown in FIG. 1A.

FIG. 6 illustrates a power switching module 112 coupled to both the DC power source 96 and the AC power source 92. In this construction, an inverter 116 converts voltage of the DC power source 96 to a suitable AC voltage for the motor 36. Downstream of the inverter 116, a relay 120 allows for switching between the two power sources. In the illustrated embodiment, the module 112 includes a relay circuit that would be normally closed on the DC power source 96 (via the inverter 116) and open on the AC power source 92. In such a case the module 112 would default to the DC power source 96 in the absence of the AC power source 92 (e.g., when the electrical cord 100 is not plugged into the AC power source 92 or no power is available to the AC power source 92). If both power sources are available, the relay would connect the AC power source 92 to the motor 36. In further embodiments, other known relay and switch arrangements may be used between the two power sources and the motor, for example, a manual switch may be used to allow the user to selectively switch between the power sources.

Figure 7:
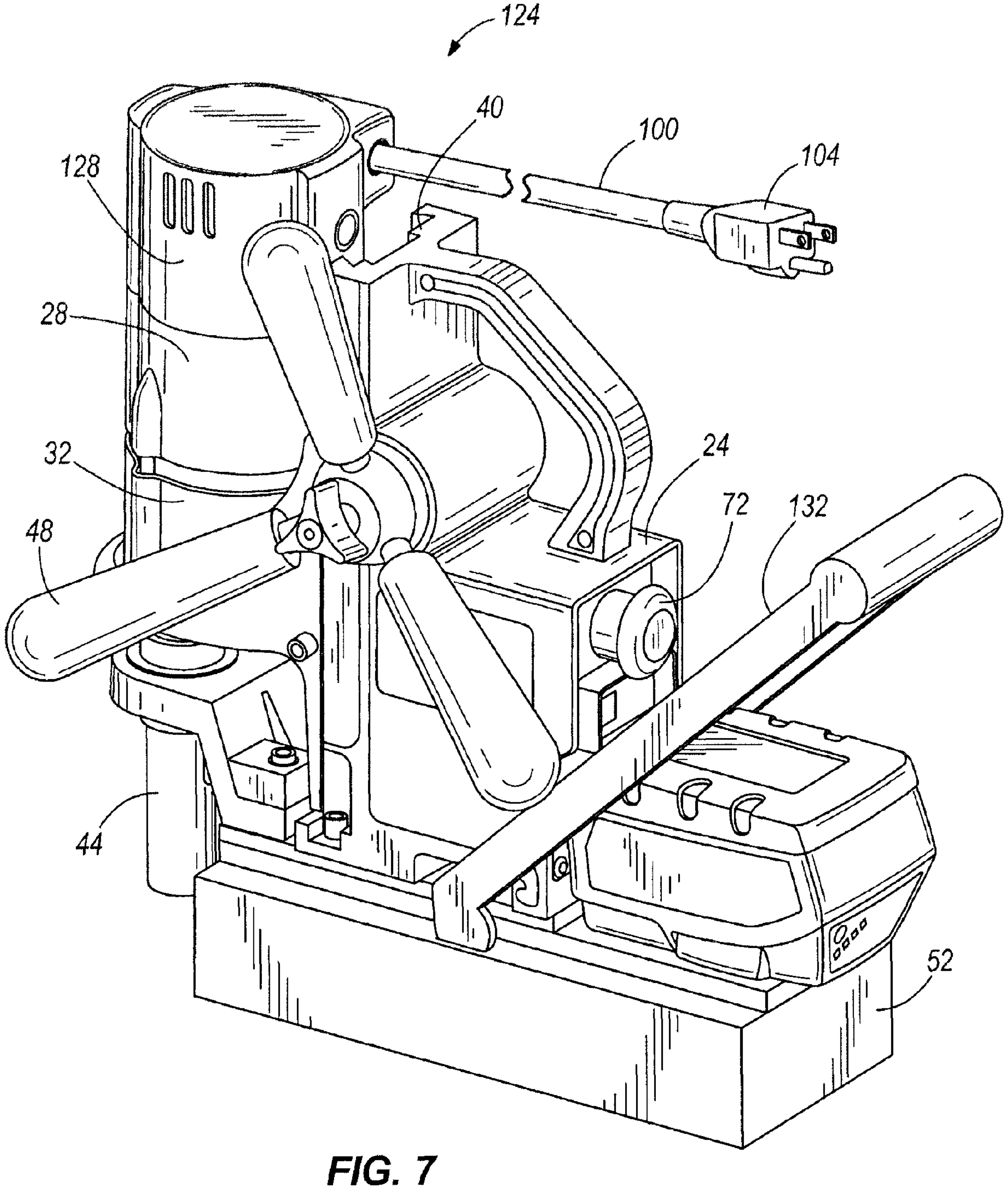
FIG. 7 is a perspective view of a magnetic drill press according to another embodiment of the invention.
Figure 8:
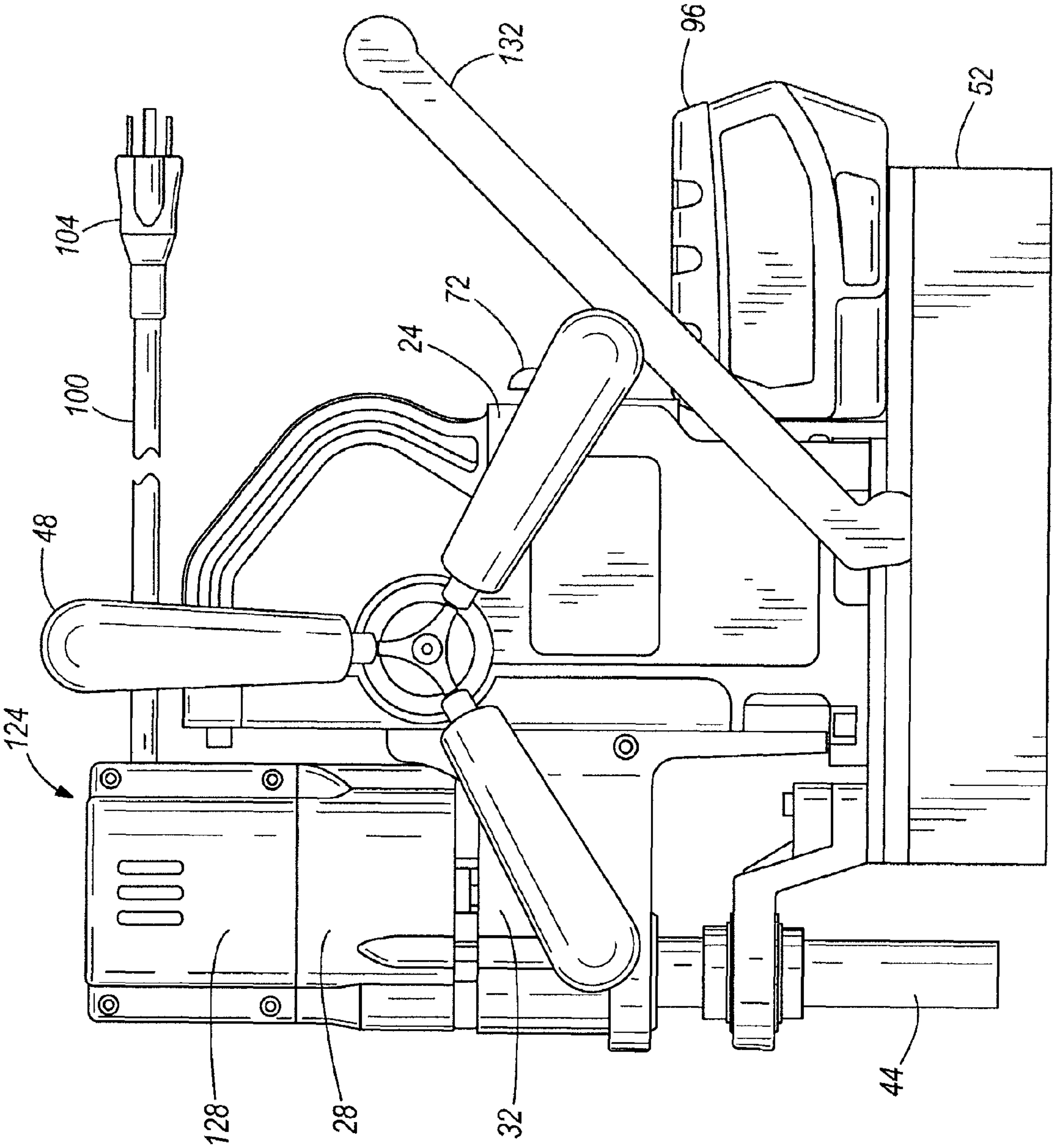
FIG. 8 is a side view of the drill press shown in FIG. 7.

FIGS. 7 and 8 illustrate a drill press 124 according to another embodiment of the invention. The drill press 124 is similar to the drill press 20 shown in FIGS. 1A-1C and 2-5; therefore, like structure will be identified by the same reference numerals. The drill press 120 includes the housing 24, the motor housing 28 and the motor carriage 32. A DC electric motor 128 is housed within the motor housing 28. The motor housing 28 is connected to the motor carriage 32, which is vertically movable along the rack 40 coupled to the housing 24. The motor 128 is coupled to the bit 44 used to drill into a workpiece (not shown). A user works the bit 44 into the workpiece by moving the motor carriage 32 along the rack 40. The user actuates the handle 48, which engages with the rack 40 and then moves the motor carriage 32 in the desired direction.

The drill press 124 further includes the magnetic base 52. Once magnetized, the magnetic base 52 secures the press 124 to the ferromagnetic workpiece via the magnetic field generated by internal magnets. In the embodiment shown in FIGS. 7 and 8, base 52 is actuated between magnetized and demagnetized positions by a lever 132. The internal operations of the base 52 are similar to that described in the previous embodiment.

Figure 9:
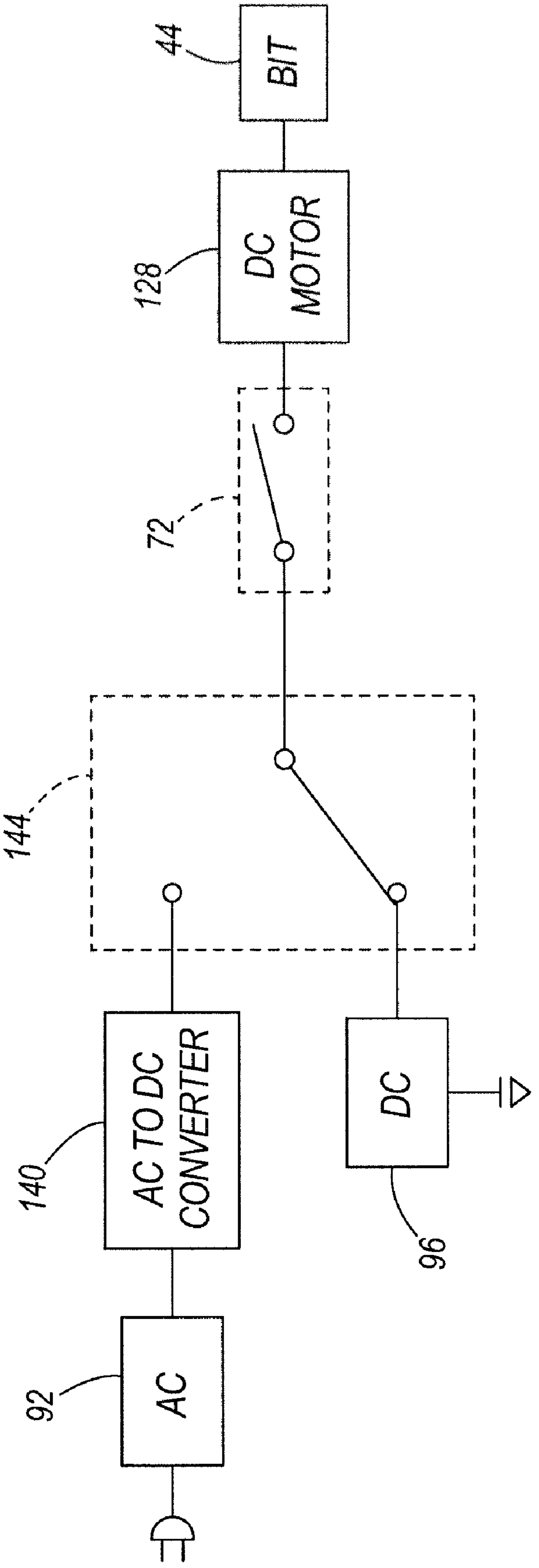
FIG. 9 is a circuit diagram illustrating a power switching module of the drill press shown in FIG. 7.

FIG. 9 schematically illustrates a power circuit used to supply electrical power to the DC motor 128 of the drill press 124. The drill press 124 includes an AC to DC converter 140. The converter 140 couples to the AC power source 92 and converts the input AC power to the appropriate DC power signal for the motor 128.

A power switching module 144 is coupled to both the converter 140 and the DC power source 96. The switching module 144 controls which power source is coupled to the motor 128 via power switch 72. In some constructions, the switch module 144 can be a mechanical switch that the user has to select manually or can be activated by connecting or removing the DC power source 96. In other constructions, the switching module 144 is automatic. In one construction, for example, the module 144 can sense when the drill 120 is connected to the AC power source 92 and switches accordingly. In this construction, for example, when the module 144 senses that the drill 124 is not connected to the AC power source 92, the module 144 switches to the DC power source 96.

Figure 10:
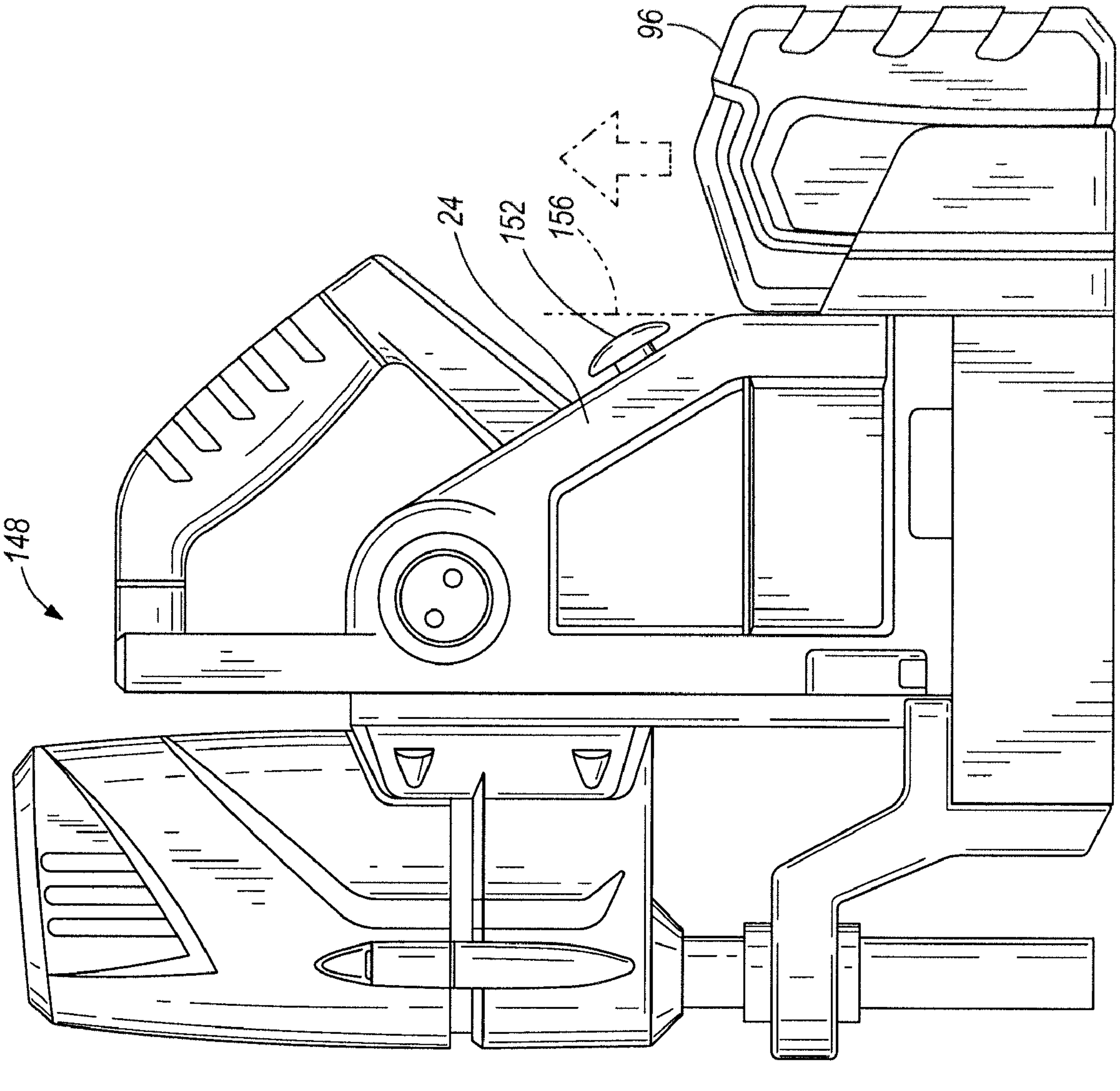
FIG. 10 is a side view of a drill press according to another embodiment of the invention, and shows a mechanical interlock between a battery pack and a power switch.

FIG. 10 illustrates a drill press 148 according to another embodiment of the invention. The drill press 148 is similar to the drill press 20 shown in FIGS. 1A-1C and 2-5; therefore, like structure will be identified by the same reference numerals. Other features of this embodiment not described or identified correspond to the common features discussed in the previous embodiments. The drill press 148 includes a power switch 152 located on a rear portion of the tool housing assembly 24 and above the battery pack connector block 108. The switch 152 operates as a push/pull type, as described with respect to FIGS. 1A-1C and 2-3. A forward surface of the battery pack 96, when mounted in the connector block 108, defines a vertical plane 156. By placing the switch 152 proximate the battery pack 96, the user is forced to push the switch in (i.e., the off position) before removing or attaching the battery pack 96. The on position of the switch 152 creates an interference through vertical plane 156 between the switch 152 and the battery pack 96, thereby preventing removal or insertion of the battery pack 96 when the switch 152 is in the on position.

Although the invention has been described with reference to certain preferred embodiments, variations and modifications exist within the scope and spirit of one or more independent aspects of the invention as described. Accordingly, the invention is not to be restricted except in light of the attached claims and their equivalents.

What is claimed is:

1. A power tool comprising:

a housing;

a base coupled to a portion of the housing, the base operable for magnetically coupling the tool to a workpiece;

an electric motor supported by the housing;

a DC power source for providing power to the motor;

an AC power input for providing power to the motor, the AC power input configured for receiving power from an AC power source;

a power supply switching unit electrically coupled to the DC power source and the AC power input, the switching unit selectively electrically coupling the motor with one of the DC power source and the AC power input, wherein the switching unit includes a relay operable to switch to one of the DC power source and the AC power input upon loss of power from the other of the DC power source and the AC power input; and a power switch for providing power to the motor from one of the DC power source and the AC power input via the switching unit, wherein the DC power source includes a battery removably coupled to the housing by insertion along a plane, the plane interferingly crossing the power switch when the power switch is in an on position to thereby form an interlock between the battery and the power switch.

2. The power tool of claim 1 wherein the base includes a magnet.

3. The power tool of claim 2 wherein the magnet is movable between a magnetized position for coupling the tool to the workpiece and a demagnetized position.

4. The power tool of claim 3, and further comprising an actuator for moving the magnet between the magnetized position and the demagnetized position.

5. The power tool of claim 3 wherein the magnet comprises a plurality of magnets, and further wherein when the magnets are in the magnetized position opposite poles of adjacent magnets are aligned and when the magnets are in the demagnetized position opposite poles of adjacent magnets are out of alignment.

6. The power tool of claim 1 wherein the base includes an actuator for selectively coupling the tool to the workpiece, and further wherein the power switch prevents the actuator from decoupling the tool to the workpiece when the power switch is in an on position.

7. The power tool of claim 6 wherein the actuator prevents the power switch from being placed in the on position when the tool is decoupled from the workpiece.

8. The power tool of claim 1 wherein the battery is a lithium-ion based battery pack.

9. The power tool of claim 1 wherein the AC power input receives a power cord.

10. The power tool of claim 1, wherein the switching unit preferentially supplies power from the AC power input to the motor.

11. A drill press comprising:

a housing;

a motor assembly including an electric motor and drill bit;

a motor carriage attached to the housing operable for moving the motor assembly relative to the housing;

a base coupled to a portion of the housing, the base operable for magnetically coupling the drill press to a workpiece;

a DC power source for providing power to the motor;

an AC power input for providing power to the motor, the AC power input configured for receiving power from an AC power source;

a power supply switching unit electrically coupled to the DC power source and the AC power input, the switching unit selectively electrically coupling the motor with one of the DC power source and the AC power input for providing power to the motor; and a power switch for providing power to the motor from one of the DC power source and the AC power input via the switching unit, wherein the DC power source includes a battery removably coupled to the housing by insertion along a plane, the plane interferingly crossing the power switch when the power switch is in an on position to thereby form an interlock between the battery and the power switch.

12. The drill press of claim 11, wherein the base includes a magnet.

13. The drill press of claim 12, wherein the magnet is movable between a magnetized position for the coupling the drill press to the workpiece and a demagnetized position.

14. The drill press of claim 13, and further comprising an actuator for moving the magnet between the magnetized and demagnetized position.

15. The drill press of claim 13, wherein the permanent magnet comprises a plurality of magnets, further wherein when the magnets are in the magnetized position opposite poles of adjacent magnets are aligned and when the magnets are in the demagnetized position opposite poles of adjacent magnets are out of alignment.

16. The drill press of claim 11 wherein the base includes an actuator for selectively coupling the drill press to the workpiece, and further wherein the power switch prevents the actuator from decoupling the drill press to the workpiece when the power switch is in an on position.

17. The drill press of claim 16 wherein the actuator prevents the power switch from being placed in the on position when the drill press is decoupled from the workpiece.

18. The drill press of claim 11, wherein the power supply switching unit includes a relay operable to switch to one of the DC power source and the AC power input upon the loss of another of the DC power source and the AC power input.

19. The drill press of claim 18, wherein the power supply switching unit preferentially supplies power from the AC power input when available.

20. The drill press of claim 18, wherein the power supply switching unit preferentially supplies power from the DC power source when available.

* * * * *